United States Patent
Kosaka

(10) Patent No.: US 9,195,922 B2
(45) Date of Patent: Nov. 24, 2015

(54) IMAGE FORMING DEVICE THAT FORMS COLOR IMAGES BY SUPERPOSING A PLURALITY OF IMAGES

(71) Applicant: BROTHER KOGYO KABUSHIKI KAISHA, Nagoya-shi, Aichi-ken (JP)

(72) Inventor: Raizo Kosaka, Konan (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/627,246

(22) Filed: Feb. 20, 2015

(65) Prior Publication Data
US 2015/0242730 A1    Aug. 27, 2015

(30) Foreign Application Priority Data

Feb. 27, 2014 (JP) ................. 2014-036802

(51) Int. Cl.
*H04N 1/60* (2006.01)
*G06K 15/02* (2006.01)
*G06K 1/00* (2006.01)

(52) U.S. Cl.
CPC ................. *G06K 15/1878* (2013.01)

(58) Field of Classification Search
None
See application file for complete search history.

(56) References Cited

U.S. PATENT DOCUMENTS

| 8,009,320 | B2 | 8/2011 | Bae |
| 9,037,011 | B2 | 5/2015 | Tsuruya |
| 2007/0242965 | A1 | 10/2007 | Akamatsu |
| 2008/0170277 | A1 | 7/2008 | Bae |
| 2009/0213399 | A1* | 8/2009 | Ikeda ............. 358/1.9 |
| 2009/0244561 | A1* | 10/2009 | Mongeon ........ 358/1.9 |
| 2011/0182602 | A1 | 7/2011 | Suzuki |

FOREIGN PATENT DOCUMENTS

| JP | 2000-158707 A | 6/2000 |
| JP | 2003-108335 A | 4/2003 |
| JP | 2005-181534 A | 7/2005 |
| JP | 2011-110825 A | 6/2011 |
| JP | 2011-154270 A | 8/2011 |
| JP | 2013-125108 A | 6/2013 |

OTHER PUBLICATIONS

Related U.S. Appl. No. 14/627,526, filed Feb. 20, 2015.
Office Action issued in related U.S. Appl. No. 14/627,526 (including PTO-892 with references cited by Examiner), Aug. 14, 2015.

* cited by examiner

*Primary Examiner* — Quang N Vo
(74) *Attorney, Agent, or Firm* — Merchant & Gould PC

(57) ABSTRACT

In an image forming device, a processor extracts a fine line region from image data, the fine line region including at least one of characters and lines; determines whether an area of the fine line region is greater than a first prescribed quantity; sets an execution condition to include a first execution condition and a second execution condition, the first execution condition being applied where the area is greater than the first prescribed quantity and being more likely to be met than the second execution condition; forms registration marks for two different colors in response to determination that a reference value set for a combination of the two different colors meets the first execution condition or the second execution condition whichever is applicable in terms of the area; and adjust image-forming positions corresponding to the two different colors subject to correction of misregistration.

19 Claims, 6 Drawing Sheets

| COLOR COMBINATION | ESTIMATED OFFSET |
|---|---|
| Y-M | 14 |
| M-C | 88 |
| C-Y | 102 |
| K-Y | 42 |
| K-M | 28 |
| K-C | 60 |

| LABEL OF THRESHOLD VALUE | THRESHOLD VALUE |
|---|---|
| FIRST THRESHOLD VALUE | 100 |
| SECOND THRESHOLD VALUE | 110 |
| THIRD THRESHOLD VALUE | 95 |
| FOURTH THRESHOLD VALUE | 105 |
| FIFTH THRESHOLD VALUE | 90 |

IMAGE FORMING DEVICE THAT FORMS COLOR IMAGES BY SUPERPOSING A PLURALITY OF IMAGES

CROSS REFERENCE TO RELATED APPLICATION

This application claims priority from Japanese Patent Application No. 2014-036802 filed Feb. 27, 2014. The entire content of the priority application is incorporated herein by reference.

TECHNICAL FIELD

The present invention relates to an image forming device and image forming system that forms color images by superposing a plurality of images and a method and program of correcting misregistration of the plurality of images, and particularly to a technique of misregistration correction for adjusting color registration.

BACKGROUND

Image forming devices that form color images by superposing images in a plurality of colors formed respectively by a plurality of process units have conventionally performed misregistration correction to adjust color registration. An example of misregistration correction is a process of forming a registration mark in each color, acquiring the amount of offset between the mark of a reference color and the mark of an adjustment color, and adjusting the position of the adjustment color based on a correction value corresponding to the mount of offset.

Various documents have been published on adjusting images, such as the misregistration correction described above. One image forming system known in the art employs a different execution condition for each type of print data in order to determine whether or not to execute the process to form registration marks. With this image forming system, the execution condition is more likely to be met for types of print data in the order of images, drawings, and text (see Japanese Patent Application Publication No. 2005-181534).

SUMMARY

However, the conventional technology described above does not consider that a certain degree of misregistration in images is not very noticeable, while the same misregistration in text or lines is more noticeable. Thus, misregistraion correctin is more effectively applied to text than images, leaving room for improvement in the conventional technology described above.

In view of the foregoing, it is an object of the present invention to provide an image forming device that performs misregistration correction to correct the positions of color images printed out of register. It is another object of the present invention to provide a technique for efficiently forming registration marks for correcting misregistraion based on the content of the image to be printed.

In order to attain the above and other objects, the present invention provides an image forming device that may include a plurality of image-forming units; a light-emitting element; a light-receiving element; and a processor. The plurality of image-forming units may be configured to form color image pieces different in color. The light-emitting element may be configured to emit light. The light-receiving element may be configured to receive light. The processor may be configured to: extract a fine line region from image data prior to forming a finished image based on the image data, the fine line region including at least one of characters and lines, the finished image including at least a color image portion formed by superposing one of the color image pieces on at least one of remaining color image pieces by using the plurality of image-forming units; determine whether an area of the fine line region is greater than a first prescribed quantity; set an execution condition for correcting misregistration between two different colors in two image pieces to be superposed one on the other, the execution condition including a first execution condition applied to a case where the area of the fine line region is greater than the first prescribed quantity; set the execution condition to include a second execution condition applied to a case where the area is not greater than the first prescribed quantity, the first execution condition being more likely to be met than the second execution condition; determine whether a reference value set for a combination of the two different colors meets the first execution condition or the second execution condition whichever is applicable in terms of the area of the fine line region; form registration marks for the two different colors in response to determination that the reference value meets the first execution condition or the second execution condition whichever is applicable in terms of the area of the fine line region; emit light toward a position of each of the registration marks by the light-emitting element; receive reflected light from the registration marks by the light-receiving element; and adjust image-forming positions corresponding to the two different colors subject to correction of misregistration based on outputs of the light-receiving element providing detection results of the position of each of the registration marks.

BRIEF DESCRIPTION OF THE DRAWINGS

The particular features and advantages of the invention as well as other objects will become apparent from the following description taken in connection with the accompanying drawings, in which:

FIG. 4 is an explanatory diagram showing a look-up table;

FIG. 5 is an explanatory diagram showing a threshold table;

DETAILED DESCRIPTION

Figure 1:
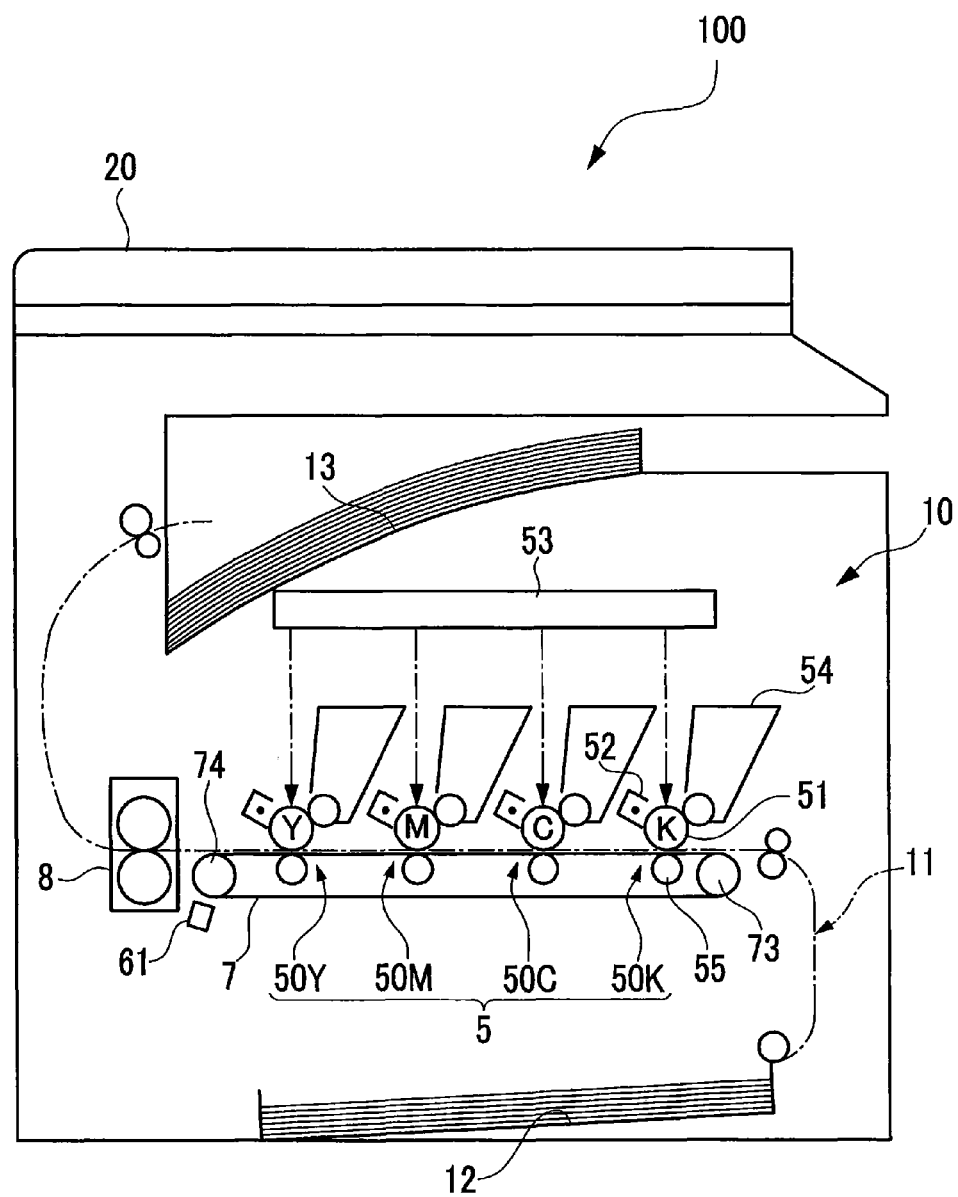
FIG. 1 is a cross-sectional view illustrating a schematic configuration of a multi-function peripheral (MFP) according to an embodiment of the present invention.

An image forming device according to a preferred embodiment of the present invention will be described while referring to the accompanying drawings wherein like parts and components are designated by the same reference numerals to avoid duplicating description. In the preferred embodiment, the present invention is applied to a multifunction peripheral (MFP) 100 provided with a color-image-forming function.

As shown in FIG. 1, the MFP 100 of the preferred embodiment includes an image-forming unit 10, and an original-reading unit 20. The image-forming unit 10 forms images on sheets, while the original-reading unit 20 reads images from originals. The original-reading unit 20 has an image sensor, and reads an image from an original while the original is moved relative to the image sensor. The method of moving the original relative to the image sensor may be a method of leaving the original stationary while moving the image sensor, or leaving the image sensor stationary while moving the original. Further, the reading system may be configured of a contact image sensor (CIS) or a charge-coupled device (CCD). Further, the original-reading unit 20 may have the capacity to read color images or may only be able to read in black and white.

The image-forming unit 10 has a process unit 5, a conveying belt 7, and a fixing unit 8. The process unit 5 forms toner images on a sheet through an electrophotographic method. The conveying belt 7 conveys sheets to a position confronting the process unit 5. The fixing unit 8 fixes the toner images transferred by the process unit 5 to the sheet. The process unit 5 includes a similar configuration for each of the colors yellow, magenta, cyan, and black. These configurations are juxtaposed along one side (the top in FIG. 1) of the conveying belt 7.

More specifically, the structures of the process unit 5 for the colors include a yellow unit 50Y, a magenta unit 50M, a cyan unit 50C, and a black unit 50K. FIG. 1 shows one arrangement and order for the color units 50 of the process unit 5, but the order of the color units 50 is not limited to the example in FIG. 1.

Each color unit 50 in the process unit 5 has a photosensitive body 51, a charging unit 52, a developing unit 54, and a transfer unit 55. The process unit 5 also includes an exposure unit 53 disposed above the color units 50 and used for all colors. Thus, the exposure unit 53 is also considered a component of the process unit 5. When the MFP 100 performs image formation, each charging unit 52 applies a charge to the surface of the corresponding photosensitive body 51, and the exposure unit 53 subsequently exposes the surface, whereby an electrostatic latent image is formed on the surface of the photosensitive body 51 based on print data. The developing unit 54 supplies toner to the electrostatic latent image formed on the surface of the corresponding photosensitive body 51 to form a toner image.

The conveying belt 7 is an endless belt that is looped around belt rollers 73 and 74. The conveying belt 7 circulates counterclockwise in FIG. 1 by the rotation of the belt rollers 73 and 74. Thus, the conveying belt 7 conveys a sheet on its outer surface in a direction from the process unit 5 toward the fixing unit 8.

The MFP 100 also includes a sheet-conveying path 11, a paper tray 12, and a discharge tray 13. The paper tray 12 accommodates sheets to be printed, while the discharge tray 13 receives sheets discharged after being printed. When printing on a sheet, the MFP 100 conveys the sheet to be printed from the paper tray 12 to the conveying belt 7 along the sheet-conveying path 11. The MFP 100 transfers toner images formed on the photosensitive bodies 51 to the sheet conveyed on the conveying belt 7.

The MFP 100 forms a color image on a sheet with toner by transferring the toner image formed on the photosensitive body 51 for each color by the color unit 50 of the corresponding color so that all toner images are superposed onto the same sheet. The toner image transferred onto the sheet is subsequently fixed to the sheet in the fixing unit 8. After the image has been fixed to the sheet, the sheet is discharged into the discharge tray 13.

Figure 2:
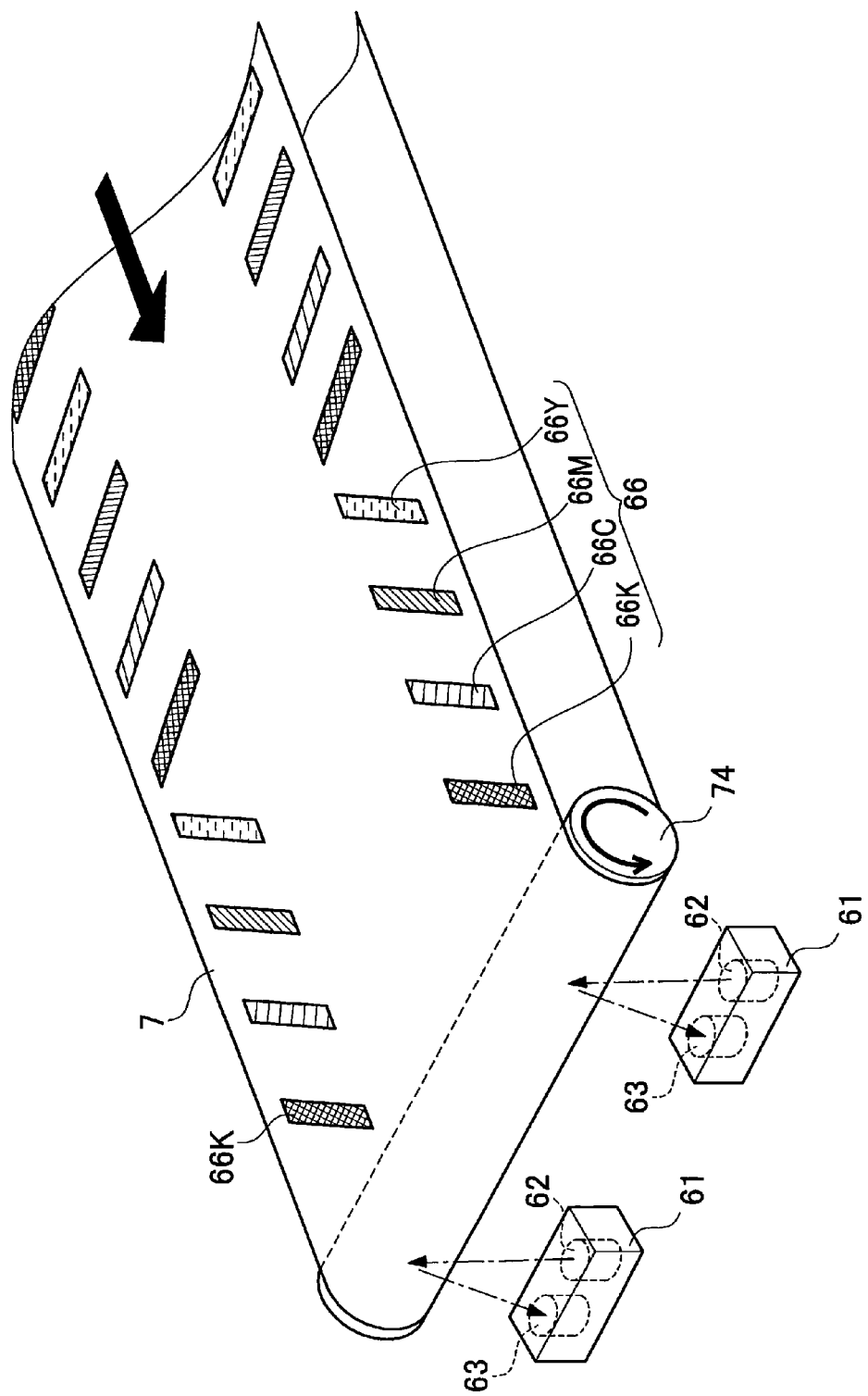
FIG. 2 is an explanatory diagram showing examples of registration marks and marker sensors.

When forming color images on the MFP 100 of the preferred embodiment, it is desirable to minimize offset in the overlapping positions of toner images formed by the color units 50. Therefore, before performing image formation, the MFP 100 executes a misregistration correction process for minimizing positional offset among color images when a condition for executing the misregistration correction process has been met. In the misregistration correction process, the MFP 100 controls the color units 50 to form registration marks 66 on the conveying belt 7 and detects the positions of the registration marks 66 formed in each color, as illustrated in the example of FIG. 2. Based on the detection results, the MFP 100 calculates correction values for adjusting the positions at which the images are formed. The misregistration correction process will be described later in greater detail.

In order to perform the above process, the MFP 100 includes marker sensors 61 for detecting toner images on the conveying belt 7. The marker sensors 61 are reflection-type optical sensors, each of which has a light-emitting element 62 and a light-receiving element 63. The light-emitting element 62 of each marker sensor 61 emits light toward the conveying belt 7, and the light-receiving element 63 receives light reflected off the conveying belt 7. The MFP 100 can detect a toner image formed on the conveying belt 7 based on a signal outputted from the marker sensor 61 in response to the intensity of light received by the light-receiving element 63.

The registration marks 66 are formed in each color provided in the process unit 5 and are positioned so as not to overlap each other. As shown in the example of FIG. 2, the registration marks 66 include marks 66Y, 66M, 66C, and 66K formed in their respective colors by the corresponding color units 50 so as to be arranged along the moving direction of the conveying belt 7. Note that the shape and arrangement order of the marks are not limited to the example in FIG. 2. The color units 50 of the process unit 5 for each color are an example of the plurality of image-forming units in the present invention.

Figure 3:
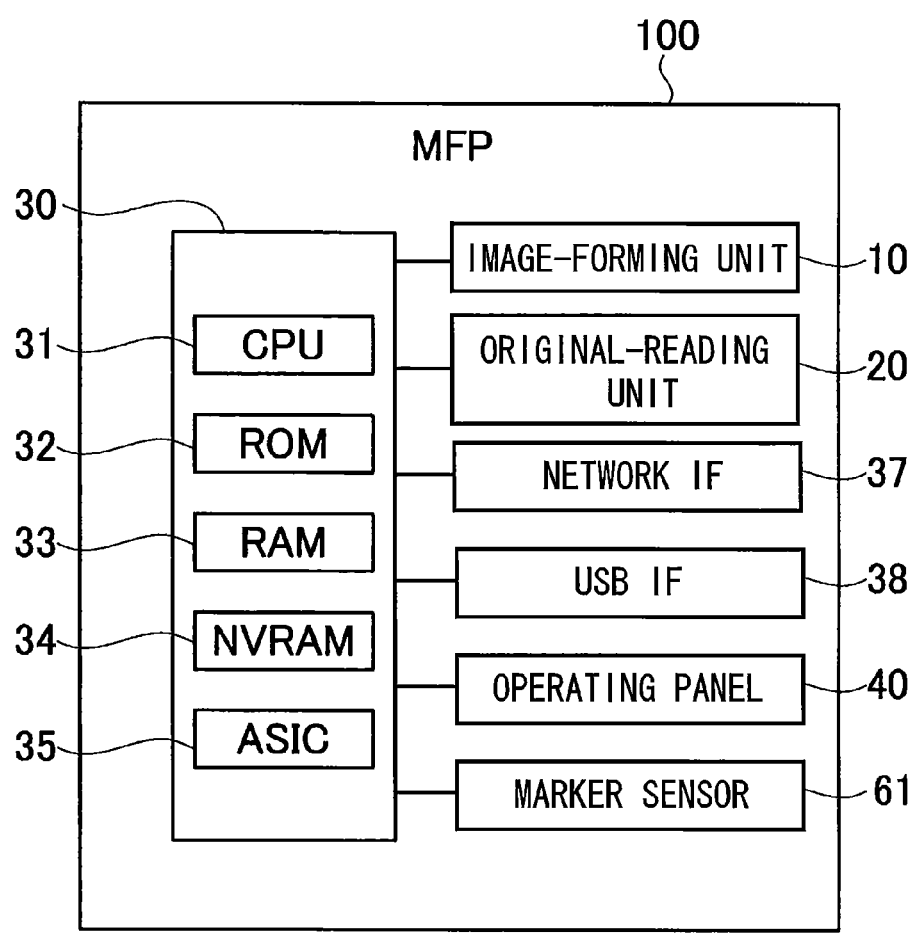
FIG. 3 is a block diagram showing an electrical configuration of the MFP.

Next, the electrical configuration of the MFP 100 will be described. As shown in FIG. 3, the MFP 100 includes a controller 30 that possesses a CPU 31, a ROM 32, a RAM 33, a NVRAM (nonvolatile RAM) 34, and an ASIC 35. The MFP 100 also includes the image-forming unit 10, original-reading unit 20, and marker sensors 61 described above, and a network interface 37, a USB interface 38, and an operating panel 40, all of which components are electrically connected to the controller 30.

The ROM 32 stores various control programs for controlling the MFP 100, various settings, initial values, and the like. The ROM 32 is an example of the storage medium in the present invention. The RAM 33 is employed as a work area into which the control programs are read, or a storage area for temporarily storing data. The CPU 31 controls the various components of the MFP 100 according to the control programs read from the ROM 32 while storing process results in the RAM 33 or NVRAM 34.

The CPU 31 is an example of the processor in the present invention. However, the controller 30 or the ASIC 35 may be considered the processor. Note that the controller 30 in FIG. 3 having the CPU 31 and the like collectively denotes all hardware used to control the MFP 100 and is not limited to a single piece of hardware in the MFP 100.

The network interface 37 is hardware for executing communications with devices connected to the MFP 100 via a network using a LAN cable or the like. The USB interface 38 is hardware for executing communications with devices connected to the MFP 100 via a USB cable or the like. The operating panel 40 displays information for the user and accepts instructions inputted by the user.

Next, the misregistration correction process performed on the MFP 100 of the preferred embodiment will be described.

Misregistration is deviation between an ideal position of a toner image and the actual position when the toner image is formed. Types of misregistration to be corrected may include deviation from an ideal position in either the main scanning direction or sub scanning direction, and relative offset among colors. While the MFP 100 of the preferred embodiment performs various processes to correct misregistration, the misregistration correction process in this specification will target offset among colors.

In the misregistration correction process, the MFP 100 of the preferred embodiment corrects positional deviation among colors by adjusting the relative positions of toner images formed in each of the plurality of colors. For example, one color of the superposed images set as a reference color, and the position of a toner image in another color is corrected to match the position of the toner image in the reference color.

In the misregistration correction process, first the MFP 100 acquires the current amount of positional offset for each color, and calculates correction values for correcting color misregistration based on the acquired positional offsets. The MFP 100 further stores the calculated correction values in the NVRAM 34. During image formation, the MFP 100 corrects the positions of each color image based on the correction values stored in the NVRAM 34 to form an image with minimal misregistration.

Thus, the misregistration correction process can be divided into an offset acquisition process for acquiring the current amounts of positional deviation; a correction value calculation process for calculating a correction value for each color needed to correct the positions of images in that color based on the offsets acquired in the offset acquisition process; and a position adjustment process for adjusting image-forming positions of images using the correction values calculated in the correction value calculation process. Since the position adjustment process in the misregistration correction process executed by the MFP 100 is a well-known procedure, a detailed description of this process will be not provided herein.

In the offset acquisition process, the MFP 100 acquires the current amount of deviation for each pair of colors. To achieve this, first the MFP 100 forms registration marks 66 for colors targeted for correction. More specifically, the process unit 5 forms toner images of the registration marks 66 while a sheet is not being conveyed on the conveying belt 7 so that the registration marks 66 are transferred onto the conveying belt 7. Subsequently, the MFP 100 detects the positions of registration marks 66 for each color on the conveying belt 7 based on signals outputted from the marker sensors 61.

The registration marks 66 shown in FIG. 2 are strip-like toner images angled in a direction that slopes relative to the moving direction of the conveying belt 7 and include a plurality of marks spaced at intervals in the moving direction of the conveying belt 7. However, the shape and arrangement of the registration marks 66 is not limited to this example. For example, the registration marks 66 may be strip-like marks arranged orthogonal to the moving direction of the conveying belt 7, or may be a combination of slanted strips and orthogonal strips. By using such a combination, it is possible to acquire positional offsets in both the main scanning direction and sub scanning direction. Note that the registration marks 66 are arranged in the direction orthogonal to the moving direction of the conveying belt 7 in positions at which the marker sensors 61 can detect them.

In the offset acquisition process, the MFP 100 acquires positional offset between marks of all colors included in the combination of colors targeted for correction based on the positions of individual registration marks 66 acquired as described above. For example, when acquiring offset between magenta and cyan marks, the MFP 100 acquires the distance between the detected position of the magenta mark 66M and the detected position of the cyan mark 66C, quantifies the difference between this acquired distance and the ideal distance while adding a positive or negative sign depending on the direction of offset, and sets the result as the positional offset. Further, the MFP 100 forms a plurality of registration marks 66, acquires positional offset a plurality of times, and sets the positional offset between magenta and cyan to the average value.

However, even after acquiring the current amounts of positional offset through the offset acquisition process described above, these amounts may change while executing a continuous print, for example. Therefore, it is possible that the amounts of offset at the beginning of an image-forming operation will differ from the amounts of offset at the time the correction values stored in the NVRAM 34 were calculated. In other words, correction values used in image formation will be based on more current offsets if the offset acquisition process and correction value calculation process are executed frequently, improving the probability of forming images with little misregistration. On the other hand, executing the offset acquisition process more frequently leads to an increase in the amount of toner expending for forming the registration marks 66 and the number of rotations of the photosensitive bodies 51, for example. This may impact the service life of the MFP 100 as a result.

Therefore, when a command to form a color image is received, the MFP 100 of the preferred embodiment determines whether it is necessary to execute the offset acquisition process prior to executing the image-forming operation. When forming a monochrome image, for example, there is little need to execute the offset acquisition process since misregistration will not occur among colors, even if the correction values stored in the NVRAM 34 do not accurately reflect the current offsets. Further, if the offset acquisition process was just executed, there is little need to execute the process again. In other words, the MFP 100 of the embodiment determines the necessity of executing the offset acquisition process based on the content of the image to be printed and the like.

A look-up table 68, such as that shown in FIG. 4, and a threshold table 69, such as that shown in FIG. 5, are stored in the NVRAM 34 to aid in determining the necessity of executing the offset acquisition process. The look-up table 68 stores an estimated offset for each combination of two colors. The threshold table 69 stores a plurality of threshold values. The MFP 100 uses the estimated offsets and threshold values stored in the NVRAM 34 to determine the necessity of executing the offset acquisition process.

Estimated offsets stored in the look-up table 68 are values found by estimating the degree of difference that has occurred between the positional offset acquired in the previous offset acquisition process and the current positional offset for each color combination and by quantifying these values. Positional offsets are initialized after executing the offset acquisition process. When the occurrence of offset is subsequently estimated, a value corresponding to the estimated offset is added to the positional offset. For example, estimated offset may correspond to the number of paged printed, the operating time, the number of times the device cover was opened and closed, or a value obtained by quantifying these parameters and adding the results.

Note that the value added to an estimated offset is predetermined for each event and each color. For example, the addition and subtraction of force applied by the user when the user opens and closes the cover increases the vibration acting on components in the MFP 100 more than when the MFP 100 is simply printing a single sheet, tending to increase offset. Accordingly, the value added to the estimated offset may be set larger for the opening and closing of the cover than the value added for a single page being printed. If the MFP 100 can sense vibrations, for example, the MFP 100 may add a prescribed value to the estimated offset based on the magnitude of the detected vibrations.

Further, heat sources in the MFP 100, such as a polygon motor (not shown) positioned near the center of the exposure unit 53 and the fixing unit 8, can affect registration in a printing operation. Since the arrangement of the color units 50 in the process unit 5 results in different distances between each color unit 50 and these heat sources, the degree of effect on registration differs for each color. Accordingly, the value added to the estimated offset may be set differently for each color. As a specific example, the polygon motor in the exposure unit 53 is positioned closer to the cyan unit 50C than the black unit 50K. Accordingly, components in the cyan unit 50C tend to have a higher temperature than components in the black unit 50K. Since the thermal expansion of components caused by an increase in temperature can alter the optical path length of the laser light emitted by the exposure unit 53, the value added to the estimated offset for cyan may be set larger than the value added to the estimated offset for black.

The threshold values stored in the threshold table 69 are used for determining whether the execution condition is met for the offset acquisition process by comparing these values to the estimated offsets described above. That is, the MFP 100 determines that the execution condition has been met for the offset acquisition process when the estimated offset is greater than the threshold value.

As shown in FIG. 5, the MFP 100 pre-stores five different threshold values. The first threshold value serves as a standard; the fourth threshold value is greater than the first threshold value; the second threshold value is greater than the fourth threshold value; the third threshold value is smaller than the first threshold value; and the fifth threshold value is smaller than the third threshold value. Thus, the execution condition is least likely to be met when employing the second threshold value and most likely to be met when employing the fifth threshold value. The following shows the order of the threshold values based on the order in which the execution condition is likely to be satisfied.

$5^{th}$ threshold value<$3^{rd}$ threshold value<$1^{st}$ threshold value<$4^{th}$ threshold value<$2^{nd}$ threshold value Thus, when a command to execute a printing operation that includes a color image is received, the MFP 100 according to the preferred embodiment selects one of the above five threshold values to be used for each color combination based on the content of the image data being printed. As an example of the selection process, the MFP 100 extracts fine line regions from the image that include at least text or lines, and selects a threshold value based on the quantity of the fine line regions. This selection process is performed because color misregistration tends to be more noticeable in fine line regions than in photo regions.

More specifically, the MFP 100 is provided with predetermined first and second references as reference quantities of fine line regions, where the second reference is smaller than the first. When the quantity of fine line regions extracted from the image being printed is greater than the first reference, the MFP 100 employs the fifth threshold value to determine whether the execution condition is satisfied, since misregistration is more likely to be noticeable in fine line regions and the execution condition is most likely to be met when using the fifth threshold value. On the other hand, if the fine line regions extracted from the image in the print data is not greater than the second reference, the MFP 100 employs the second threshold value for determining whether the execution condition is satisfied since misregistration is not likely to be noticeable and the execution condition is least likely to be met when using the second threshold value. Here, the first reference is an example of the second prescribed quantity in the present invention, and the second reference is an example of the first prescribed quantity. The process of selecting a threshold value will be described later in greater detail.

Thus, when a command to execute a color printing operation is received, the MFP 100 reads the estimated offsets from the look-up table 68 and the threshold values from the threshold table 69 and compares the values prior to executing the printing operation. The MFP 100 executes the offset acquisition process prior to executing the specified printing operation for only those colors in color combinations for which the execution condition for executing the offset acquisition process was met. The MFP 100 also executes the correction value calculation process based on the positional offsets acquired in the offset acquisition process to calculate correction values for correcting this offset. The MFP 100 then uses these correction values to adjust the image-forming positions of the respective color images when performing the printing operation.

On the other hand, the MFP 100 determines that there is little need to execute the offset acquisition process prior to the printing operation for colors not included in color combinations determined to have met the execution condition. That is, since the MFP 100 can predict that the amount of difference between the current offset and the offset found during the previous misregistration correction process is not a high level, accordingly, the MFP 100 executes the printing operation while using the offset correction values calculated and stored in the previous misregistration correction process to adjust the image-forming positions.

Next, steps in a printing process executed by the MFP 100 of the preferred embodiment will be described with reference to the flowchart in FIG. 6. In this printing process, the MFP 100 determines whether the execution conditions have been met for executing an offset acquisition process, adjust the image-forming positions, and executes the printing operation. The CPU 31 of the MFP 100 executes this printing operation when the MFP 100 receives image data to be printed. The image data to be printed may be data for an image read by the original-reading unit 20, or image data received through the network interface 37 or USB interface 38.

In S101 at the beginning of the printing process, the MFP 100 determines whether its printing mode has been set to the monochrome mode. In the monochrome mode, the MFP 100 prints with toner of a single color, regardless of the content in the image data. Thus, there is little need to correct color misregistration in the monochrome mode. Therefore, if the MFP 100 determines that the monochrome mode is set (S101: YES), in S102 the MFP 100 executes the printing operation. Note that even when the monochrome mode has not been set, the MFP 100 may reach a YES determination in S101 if the image data has only data using toner of a single color.

If the monochrome mode has not been set (S101: NO), in S104 the MFP 100 extracts fine line regions from the image data. A fine line region is any region that includes either text or lines. The MFP 100 may extract fine line regions using a technique well known in the art, such as object segmentation. In the process of object segmentation, the region represented by the image data is divided into text regions, photo regions, and graphic regions, for example. The MFP 100 extracts regions determined to be text regions and regions of lines within graphic regions based on the processing results of the object segmentation process.

Note that in S104 the MFP 100 extracts fine line regions from among superposition regions in the image to be printed, where superposition regions are regions in which a plurality of colors are superposed. In other words, regions targeted for extraction in S104 are regions of text or lines depicted by the superposition of toner in a plurality of colors because misregistration among superposed colors in these regions tends to be noticeable.

In S105 the MFP 100 determines whether the area of fine line regions extracted in S104 is greater than the first reference described above. Here, the MFP 100 determines the area of the fine line regions based on the number of pixels in those regions, for example. If the MFP 100 determines that the area of the fine line regions is greater than the first reference (S105: YES), in S106 the MFP 100 sets the threshold value for all color combinations to the fifth threshold value. As described above, the fifth threshold value is most likely to lead to a satisfied execution condition among the five threshold values.

That is, when there is a large area of fine line regions, even a small amount of color misregistration in these regions will be noticeable. Therefore, the MFP 100 sets the threshold values to the fifth threshold value when reaching a YES determination in S105 so that the execution condition for the offset acquisition process is more likely to be satisfied.

On the other hand, if the MFP 100 determines that the area of fine line regions is not greater than the first reference (S105: NO), in S108 the MFP 100 determines whether the area of fine line regions acquired in S104 is greater than the predetermined second reference. If the area of fine line regions is not greater than the second reference (S108: NO), in S109 the MFP 100 sets the threshold value for all color combinations to the second threshold value. As described above, the second threshold value is least likely to lead to satisfaction of the execution condition among the five threshold values.

That is, even a large amount of color misregistration is not very noticeable in regions that do not contain fine lines, such as photos and solid images. Therefore, the MFP 100 sets the threshold value to a large value when the area of fine line regions is small, so that the execution condition for the offset acquisition process is less likely to be met.

When the MFP 100 determines that the area of fine line regions is greater than the second reference (S108: YES), in S111 the MFP 100 determines whether any of the fine line regions extracted in S104 are color regions formed by superposing only cyan and magenta. If the MFP 100 determines that there are regions formed of only cyan and magenta (S111: YES), in S112 the MFP 100 sets the threshold value for the cyan-magenta color combination to the third threshold value.

The MFP 100 sets the threshold value to a smaller value for the cyan-magenta color combination so that the execution condition for the offset acquisition process is more likely to be met because color misregistration tends to be more obvious in fine line regions formed by the superposition of only cyan and magenta. Note that even though the image possesses fine line regions formed only of cyan and magenta, the threshold value for color combinations other than the cyan-magenta combination is set to the first threshold value. Further, the threshold value for color combinations not found in fine regions is set to the second threshold value.

However, if the MFP 100 determines that there are no color regions formed by superposing only cyan and magenta in the fine line regions extracted in S104 (S111: NO), in S114 the MFP 100 determines whether the color combinations included in the fine line regions extracted in S104 are any one of the following: only the yellow-magenta combination, only the yellow-cyan combination, and only the yellow-magenta combination and the yellow-cyan combination. In other words, the MFP 100 reaches a YES determination in S114 when the fine line regions include no combinations of black and another color and no combinations of three or more colors.

When the MFP 100 determines that the colors in the fine line regions are any one of only the yellow-magenta combination, only the yellow-cyan combination, and only the yellow-magenta combination and the yellow-cyan combination (S114: YES), in S115 the MFP 100 sets the threshold value for the color combinations in the fine line regions to the fourth threshold value.

Here, the MFP 100 sets the threshold values for the yellow-magenta combination or the yellow-cyan combination to a larger value so that the execution condition for the offset acquisition process is less likely to be met because color misregistration tends to be less obvious in regions formed with these color combinations than regions with other color combinations. Note that when other color combinations are included in regions other than fine line regions, the threshold value for these color combinations is set to the second threshold value.

If the MFP 100 determines that the color combinations in fine line regions include combinations other than the yellow-magenta combination and yellow-cyan combination (S114: NO), in S117 the MFP 100 sets the threshold value for all color combinations to the first threshold value. In other word, the MFP 100 reaches a NO determination in S114 when the fine line regions include combinations of black and another color or combinations of three or more colors. At this point, the MFP 100 has set a threshold value for each color combination needed to determine whether the condition for executing the offset acquisition process is met.

In S119 the MFP 100 reads the estimated offset for each color combination from the look-up table 68 stored in the NVRAM 34. In S120 the MFP 100 determines whether the estimated offset for any color combination in the look-up table 68 exceeds the threshold value set for that color combination, where the threshold values have been set to one of the first through fifth values for each color combination in the processes described above in S106, S109, S112, S115, and S117.

Figure 7:
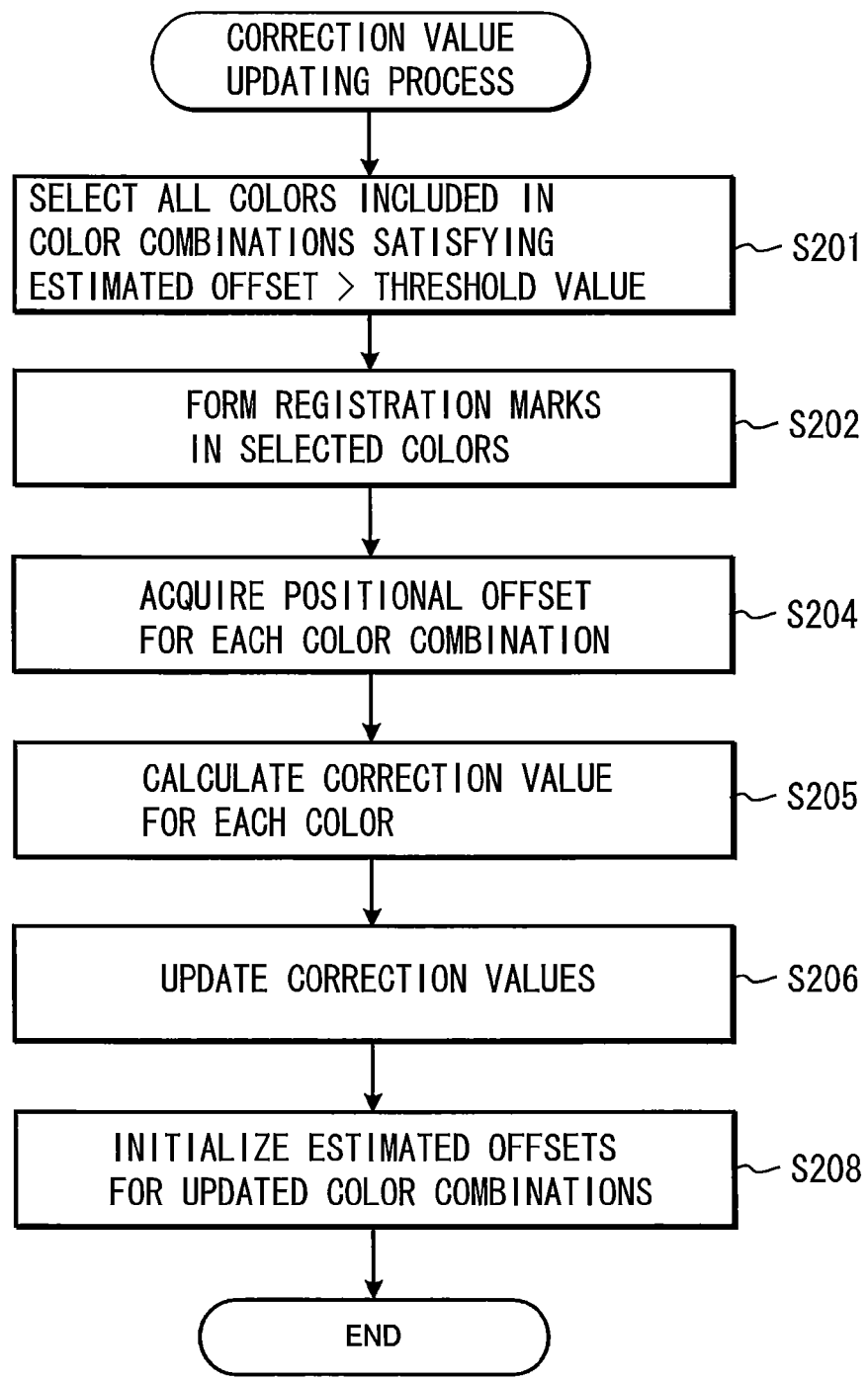
FIG. 7 is a flowchart illustrating steps in a correction value updating process.

If the MFP 100 determines that the estimated offset exceeds the threshold value for any color combination (S120: YES), in S121 the MFP 100 executes a correction value updating process. The correction value updating process is a process for executing the offset acquisition process to update the correction values. Next, steps in the correction value updating process will be described with reference to the flowchart in FIG. 7.

In S201 at the beginning of the correction value updating process, the MFP 100 selects all colors included in color combinations whose estimated offset is greater than the corresponding threshold value, i.e., the colors in color combinations that satisfy the execution condition for the offset acquisition process. In S202 the MFP 100 forms registration marks 66 with the process unit 5 in the selected colors.

Next, the MFP 100 controls the marker sensors 61 to emit light from the light-emitting elements 62 onto the conveying belt 7 in the paths of the registration marks 66 formed on the conveying belt 7 and to receive light reflected from the registration marks 66 with the light-receiving elements 63. The MFP 100 acquires the position of each registration mark 66 formed in S202 based on the output signals from the marker sensors 61. In S204 the MFP 100 acquires the positional offset for each color combination based on the acquired positions of the registration marks 66.

In S205 the MFP 100 calculates a correction value for correcting the relevant color misregistration based on the positional offset acquired in S204. Here, the MFP 100 may modify the correction value for one of the colors in the color combination and adjust the position of that color to match the position of the other color, or may adjust both colors in the color combination to approach each other. In S206 the MFP 100 updates the correction values stored in the NVRAM 34 with the above newly calculated correction values.

Note that the MFP 100 may update the correction value for a color combination not among the color combinations whose estimated offset is greater than their threshold value, provided that positional offset can be acquired for the color combination based on the registration marks 66 formed in S202. In other words, in S205 and S206 the MFP 100 may calculate and store correction values based on positional offsets acquired in S204.

After updating the correction value for each color, in S208 the MFP 100 initializes the estimated offsets in the look-up table 68 for the updated color combinations, and subsequently ends the correction value updating process. Note that estimated offsets for color combinations that were not updated are left unchanged.

Returning to FIG. 6, after completing the correction value updating process in S121, in S102 the MFP 100 adjusts the positions for forming images in each color using the correction values stored in the NVRAM 34 and executes a printing operation. Subsequently, the MFP 100 ends the printing process.

However, if the MFP 100 determines in S120 that the estimated offset does not exceed the corresponding threshold value for any color combination (S120: NO), the MFP 100 skips the correction value updating process and in S102 adjusts the positions of color images using the correction values already stored in the NVRAM 34 and executes the printing operation. Subsequently, the MFP 100 ends the printing process.

As described above in detail, the MFP 100 according to the embodiment extracts fine line regions from the image that are superposition regions in which a plurality of colors are superposed, and sets different conditions for executing the offset acquisition process depending on whether the extracted fine line regions exceed a prescribed quantity. Thus, the MFP 100 sets an execution condition that is less likely to be met when the fine line regions are not greater than the second reference than when the fine line regions are greater than the second reference. Next, the MFP 100 forms registration marks 66 based on whether the estimated offsets meet the execution conditions. Therefore, there is little chance that registration marks 66 will be formed when printing images having a small quantity of fine line regions, even though color misregistration is more noticeable in fine line regions. In this way, the MFP 100 can be expected to form registration marks 66 for correcting color misregistration more efficiently based on the content of the image being printed.

While the invention has been described in detail with reference to specific embodiments thereof, it would be apparent to those skilled in the art that many modifications and variations may be made therein without departing from the spirit of the invention, the scope of which is defined by the attached claims. For example, the present invention is not limited to applications in MFPs, but may be applied to a photocopier, a fax machine, or any device provided with an image-forming function. Further, the present invention may be applied to an image forming device employing an inkjet system rather than an electrophotographic system.

In the preferred embodiment, the MFP 100 only forms marks in color included in color combinations that satisfy the execution condition, but the MFP 100 may execute the offset acquisition process after forming marks in all colors when one or more color combinations meets the execution condition. In this case, the MFP 100 need only be provided with one type of offset acquisition process and one type of correction value calculation process for calculating offset correction values. However, toner consumption can be more reliably reduced by forming marks in only the colors included in color combinations that satisfy the execution condition.

Further, the estimated offset may be a single value, for example, rather than having an estimated offset for each color combination as in the preferred embodiment. In this case, the single estimated offset may be compared with a threshold value selected as described in the embodiment.

Figure 6:
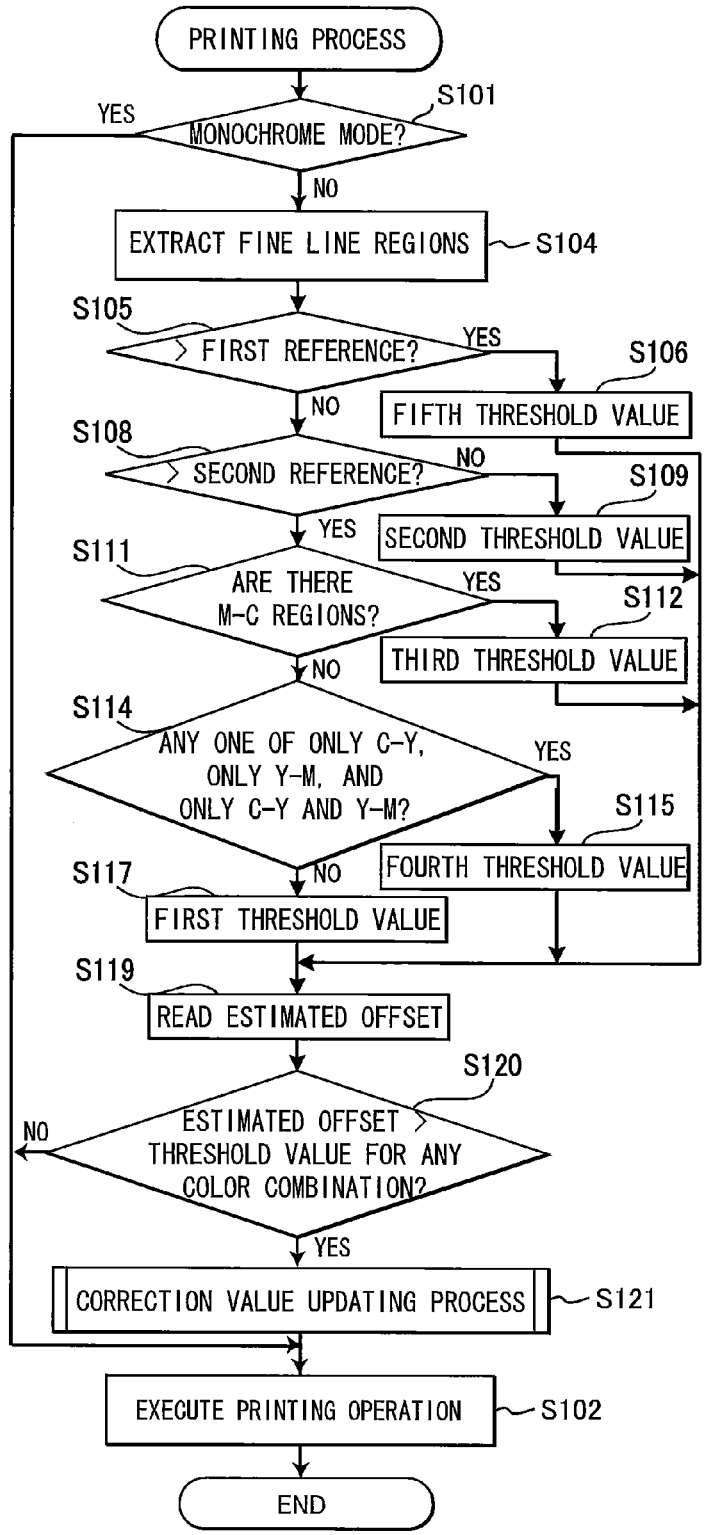
FIG. 6 is a flowchart illustrating steps in a printing process.

Further, while the area of the fine line regions is compared with threshold values in S105 and S108 of FIG. 6, the determination in these steps may be made based on the percentage of the overall image that the fine line regions occupy. Further, the determination with the first reference in S105 may be omitted. In other words, it is possible to use just one reference for comparison with the size of the fine line region. For example, the threshold value may be set to the first threshold value when the fine line region is greater than the second reference and set to the second threshold value when the fine line region is not greater than the second reference.

The determinations of S111 and S114 of FIG. 6 may also be omitted. That is, the threshold values are set to different values for different color combinations based on the type of color combination used in fine line regions in the preferred embodiment, but the present invention is not limited to this method. For example, the MFP 100 may be configured to execute just one of steps S111 and S114 or neither of these steps. Further, the threshold values assigned to color combinations not involved in these determinations are not limited to the example in the embodiments. For example, the first threshold may be used for all other color combinations.

Further, the number of threshold values and the numerical values assigned to these threshold values in the threshold table 69 are not limited to the example in the embodiment. For example, if only four threshold values are used without the fifth threshold value in the embodiment, the same third threshold value may be used when reaching a YES determination in both S105 and S111 of FIG. 6.

Further, in S104 of FIG. 6 described in the embodiment, the MFP 100 extracts fine line regions from regions having a plurality of superposed colors, but the MFP 100 may extract fine line regions regardless of whether the regions are superposition regions.

Further, the present invention may be implemented on an image forming system that includes an image forming device and data processing device. In this case, some of the processes in the printing process of the embodiment may be executed by the data processing device. For example, the data processing device may execute the process for extracting fine line regions from the image data to be printed. In this case, the data processing device transmits data for the extracted fine line regions to the image forming device together with the image data to be printed. The data processing device may also be used to execute processes up to the process for setting threshold values based on the size of the extracted fine line regions. Further, the data processing device may acquire estimated offsets from the image forming device and may execute processes up to the determination of the execution condition.

Further, the registration marks 66 need not be formed on the conveying belt 7, but may be formed in another location at which toner images in each color can be superposed. For example, in an image forming device employing a secondary transfer system, the registration marks 66 are formed on the intermediate transfer belt. In an image forming device employing a 4-cycle system, the registration marks 66 are formed on the photosensitive body.

The processes described in the embodiment may be executed by a single CPU, a plurality of CPUs, hardware such as an ASIC, or a combination of these components. Further, the processes described in the embodiment may be implemented according to various methods and using any of various storage media for storing programs used to execute the processes.

What is claimed is:

1. An image forming device comprising:
a plurality of image-forming units configured to form color image pieces different in color;
a light-emitting element configured to emit light;
a light-receiving element configured to receive light; and
a processor configured to:
extract a fine line region from image data prior to forming a finished image based on the image data, the fine line region including at least one of characters and lines, the finished image including at least a color image portion formed by superposing one of the color image pieces on at least one of remaining color image pieces by using the plurality of image-forming units;
determine whether an area of the fine line region is greater than a first prescribed quantity;
set an execution condition for correcting misregistration between two different colors in two image pieces to be superposed one on the other, the execution condition including a first execution condition applied to a case where the area of the fine line region is greater than the first prescribed quantity;
set the execution condition to include a second execution condition applied to a case where the area is not greater than the first prescribed quantity, the first execution condition being more likely to be met than the second execution condition;
determine whether a reference value set for a combination of the two different colors meets the first execution condition or the second execution condition whichever is applicable in terms of the area of the fine line region;
form registration marks for the two different colors in response to determination that the reference value meets the first execution condition or the second execution condition whichever is applicable in terms of the area of the fine line region;
emit light toward a position of each of the registration marks by the light-emitting element;
receive reflected light from the registration marks by the light-receiving element; and
adjust image-forming positions corresponding to the two different colors subject to correction of misregistration based on outputs of the light-receiving element providing detection results of the position of each of the registration marks.

2. The image forming device according to claim 1, wherein the processor is configured to extract the fine line region from the color image portion.

3. The image forming device according to claim 1, wherein the processor is further configured to:
determine whether colors of the image pieces formed by the plurality of image-forming units include at least cyan and magenta; and
set the execution condition to include a third execution condition in response to determination that the fine line region is formed by superposing cyan and magenta, the third execution condition being more likely to be met than the first execution condition.

4. The image forming device according to claim 1, wherein colors of the image pieces to be formed by the plurality of image-forming units include at least yellow, cyan, and magenta, and
wherein the processor is further configured to:
determine whether the fine line region is depicted by at least one of a yellow-magenta superposed color and a yellow-cyan superposed color; and
set the execution condition to include a fourth execution condition in response to determination that the fine line region is depicted by at least one of the yellow-magenta superposed color and the yellow-cyan superposed color, the fourth execution condition being less likely to be met than the first execution condition and being more likely to be met than the second execution condition.

5. The image forming device according to claim 1, wherein the processor is further configured to:
acquire at least a reference value set for a combination of the two different colors included in the fine line region; and
determine whether the reference value meets the fourth execution condition.

6. The image forming device according to claim 5, wherein the processor is configured to instruct the plurality of image-forming units to form the registration mark for each of the two different colors for which the reference value meets the fourth execution condition and not to form registration marks for each of the two different colors for which the reference value does not meet the fourth execution condition.

7. The image forming device according to claim 1, wherein the processor is further configured to:
determine whether the area of the fine line region is greater than a second prescribed quantity larger than the first prescribed quantity; and
set the execution condition to include a fifth execution condition in response to determination that the area of the fine line region is greater than the second prescribed quantity, the fifth execution condition being more likely to be met than the first execution condition.

8. A misregistration adjusting method for an image forming device including a plurality of image-forming units configured to form color image pieces different in color, a light-emitting element configured to emit light, and a light-receiving element configured to receive light, the method comprising:
extracting a fine line region from image data prior to forming a finished image based on the image data, the fine line region including at least one of characters and lines, the finished image including at least a color image portion formed by superposing one of the color image pieces on at least one of remaining image pieces by using the plurality of image-forming units;
determining whether an area of the fine line region is greater than a first prescribed quantity;
setting an execution condition for correcting misregistration between two different colors in two image pieces to be superposed one on the other, the execution condition including a first execution condition applied to a case where the area of the fine line region is greater than the first prescribed quantity;

setting the execution condition to include a second execution condition applied to a case where the area is not greater than the first prescribed quantity, the first execution condition being more likely to be met than the second execution condition;

determining whether a reference value set for a combination of the two different colors meets the first execution condition or the second execution condition whichever is applicable in terms of the area of the fine line region;

forming registration marks for the two different colors in response to determination that the reference value meets the first execution condition or the second execution condition whichever is applicable in terms of the area of the fine line region;

emitting light toward a position of each of the registration marks by the light-emitting element;

receiving reflected light from the registration marks by the light-receiving element; and adjusting image-forming positions corresponding to the two different colors subject to correction of misregistration based on outputs of the light-receiving element providing detection results of the position of each of the registration marks.

9. The misregistration adjusting method according to claim 8, further comprising:

determining whether colors of the image pieces formed by the plurality of image-forming units include at least cyan and magenta; and setting the execution condition to include a third execution condition in response to determination that the fine line region is formed by superposing cyan and magenta, the third execution condition being more likely to be met than the first execution condition.

10. The misregistration adjusting method according to claim 8, wherein colors of the image pieces to be formed by the plurality of image-forming units include at least yellow, cyan, and magenta, and wherein the method further comprises:

determining whether the fine line region is depicted by at least one of a yellow-magenta superposed color and a yellow-cyan superposed color; and setting the execution condition to include a fourth execution condition in response to determination that the fine line region is depicted by at least one of the yellow-magenta superposed color and the yellow-cyan superposed color, the fourth execution condition being less likely to be met than the first execution condition and being more likely to be met than the second execution condition.

11. The misregistration adjusting method according to claim 8, further comprising:

acquiring at least a reference value set for a combination of the two different colors included in the fine line region; and determining whether the reference value meets the fourth execution condition.

12. The misregistration adjusting method according to claim 11, further comprising:

instructing the plurality of image-forming units to form the registration mark for each of the two different colors for which the reference value meets the fourth execution condition and not to form registration marks for each of the two different colors for which the reference value does not meet the fourth execution condition.

13. The misregistration adjusting method according to claim 8, further comprising:

determining whether the area of the fine line region is greater than a second prescribed quantity larger than the first prescribed quantity; and setting the execution condition to include a fifth execution condition in response to determination that the area of the fine line region is greater than the second prescribed quantity, the fifth execution condition being more likely to be met than the first execution condition.

14. A non-transitory computer readable storage medium storing a set of program instructions executed by a computer, the program instructions comprising:

extracting a fine line region from image data prior to forming a finished image based on the image data, the fine line region including at least one of characters and lines, the finished image including at least a color image portion formed by superposing one of the color image pieces on at least one of remaining color image pieces by using a plurality of image-forming units;

determining whether an area of the fine line region is greater than a first prescribed quantity;

setting an execution condition for correcting misregistration between two different colors in two image pieces to be superposed one on the other, the execution condition including a first execution condition applied to a case where the area of the fine line region is greater than the first prescribed quantity;

setting the execution condition to include a second execution condition applied to a case where the area is not greater than the first prescribed quantity, the first execution condition being more likely to be met than the second execution condition;

determining whether a reference value set for a combination of the two different colors meets the first execution condition or the second execution condition whichever is applicable in terms of the area of the fine line region;

forming registration marks for the two different colors in response to determination that the reference value meets the first execution condition or the second execution condition whichever is applicable in terms of the area of the fine line region;

emitting light toward a position of each of the registration marks by a light-emitting element;

receiving reflected light from the registration marks by a light-receiving element; and adjusting image-forming positions corresponding to the two different colors subject to correction of misregistration based on outputs of the light-receiving element providing detection results of the position of each of the registration marks.

15. The non-transitory computer readable storage medium according to claim 14, wherein the program instructions further comprise:

determining whether colors of the image pieces formed by the plurality of image-forming units include at least cyan and magenta; and setting the execution condition to include a third execution condition in response to determination that the fine line region is formed by superposing cyan and magenta, the third execution condition being more likely to be met than the first execution condition.

16. The non-transitory computer readable storage medium according to claim 14, wherein colors of the image pieces to be formed by the plurality of image-forming units include at least yellow, cyan, and magenta, and
  wherein the program instructions further comprise:
    determining whether the fine line region is depicted by at least one of a yellow-magenta superposed color and a yellow-cyan superposed color; and
    setting the execution condition to include a fourth execution condition in response to determination that the fine line region is depicted by at least one of the yellow-magenta superposed color and the yellow-cyan superposed color, the fourth execution condition being less likely to be met than the first execution condition and being more likely to be met than the second execution condition.

17. The non-transitory computer readable storage medium according to claim 14, wherein the program instructions further comprise:
  acquiring at least a reference value set for a combination of the two different colors included in the fine line region; and
  determining whether the reference value meets the fourth execution condition.

18. The non-transitory computer readable storage medium according to claim 17, wherein the program instructions further comprise instructing the plurality of image-forming units to form the registration mark for each of the two different colors for which the reference value meets the fourth execution condition and not to form registration marks for each of the two different colors for which the reference value does not meet the fourth execution condition.

19. The non-transitory computer readable storage medium according to claim 14, wherein the program instructions further comprise:
  determining whether the area of the fine line region is greater than a second prescribed quantity larger than the first prescribed quantity; and
  setting the execution condition to include a fifth execution condition in response to determination that the area of the fine line region is greater than the second prescribed quantity, the fifth execution condition being more likely to be met than the first execution condition.

* * * * *